United States Patent
Sukharev et al.

(10) Patent No.: US 10,013,523 B2
(45) Date of Patent: Jul. 3, 2018

(54) FULL-CHIP ASSESSMENT OF TIME-DEPENDENT DIELECTRIC BREAKDOWN

(71) Applicant: Mentor Graphics Corporation, Wilsonville, OR (US)

(72) Inventors: Valeriy Sukharev, Campbell, CA (US); Xin Huang, Sunnyvale, CA (US)

(73) Assignee: Mentor Graphics Corporation, Wilsonville, OR (US)

( * ) Notice: Subject to any disclaimer, the term of this patent is extended or adjusted under 35 U.S.C. 154(b) by 0 days.

(21) Appl. No.: 15/201,294

(22) Filed: Jul. 1, 2016

(65) Prior Publication Data

US 2017/0286588 A1  Oct. 5, 2017

Related U.S. Application Data

(60) Provisional application No. 62/314,663, filed on Mar. 29, 2016.

(51) Int. Cl.
*G06F 17/50* (2006.01)

(52) U.S. Cl.
CPC ................ *G06F 17/5081* (2013.01)

(58) Field of Classification Search
CPC .................................... G06F 17/5081
USPC ......................................... 716/107
See application file for complete search history.

(56) References Cited

U.S. PATENT DOCUMENTS

| | | | | |
|---|---|---|---|---|
| 8,683,420 B2 * | 3/2014 | Wang | ............... | H01L 22/14 716/100 |
| 8,689,168 B1 * | 4/2014 | Baumann | ............ | G06F 17/5036 716/136 |
| 2007/0185683 A1 * | 8/2007 | Foo | .................. | G05B 19/41875 702/181 |
| 2008/0309365 A1 * | 12/2008 | Liao | ................... | G01R 31/2858 324/762.09 |
| 2011/0279142 A1 * | 11/2011 | Cho | ...................... | G01R 31/261 324/762.01 |
| 2014/0096098 A1 * | 4/2014 | Weir | .................... | G06F 17/5009 716/112 |

OTHER PUBLICATIONS

J. McPherson and H. Mogul, "Underlying Physics of the Thermochemical E Model in Describing Low-Field Time-Dependent Dielectric Breakdown in SiO2 Thin Films," Journal of Applied Physics, vol. 84, No. 3, pp. 1513-1523, 1998.

(Continued)

*Primary Examiner* — Suresh Memula

(57) ABSTRACT

Aspects of the disclosed technology relate to techniques of full-chip assessment of time-dependent dielectric breakdown. A layout design is analyzed to identify matching patterns that match a pre-calculated pattern in a pattern database. Each of pre-calculated patterns in the pattern database has a time-to-failure characteristic value pre-computed based on a model of electric current path generation and evolution. Time-to-failure characteristic values are then determined for the matching patterns based on the pre-computed time-to-failure characteristic values and electric attributes of geometric elements in each of the matching patterns. Based on the time-to-failure characteristic values, matching patterns most susceptible to time-dependent dielectric breakdown are identified and fixed.

18 Claims, 13 Drawing Sheets

Flow chart 1000

(56) References Cited

OTHER PUBLICATIONS

I. C. Chen, S. Holland, and C. Hu, "A Quantitative Physical Model for Time-Dependent Breakdown in SiO2," in IEEE International Reliability Physics Symposium (IRPS), pp. 26-28, 1985.
F. Chen et al., "A Comprehensive Study of Low-k SiCOH TDDB Phenomena and Its Reliability Lifetime Model Development," in IEEE International Reliability Physics Symposium (IRPS), pp. 46-53, 2006.
N. Suzumura et al., "A New TDDB Degradation Model Based on Cu Ion Drift in Cu Interconnect Dielectrics," in IEEE International Reliability Physics Symposium (IRPS), pp. 26-30, 2006.
J. W. McPherson, "Time Dependent Dielectric Breakdown Physics-Models Revisited," Microelectronics Reliability, vol. 52, No. 9, pp. 1753-1760, 2012.
Bashir et al., "Backend Low-k TDDB Chip Reliability Simulator," in IEEE International Reliability Physics Symposium (IRPS), pp. 2C.2.1-2C.2.10, 2011.
K.-H. Aliers, "Prediction of Dielectric Reliability From I-V Characteristics: Poole-Frenkel Conduction Mechanism Leading to $\sqrt{E}$ Model for Silicon Nitride MIM Capacitor," Microelectronics Reliability, vol. 44, No. 3, pp. 411-423, 2003.
T. L. Tan, C. L. Gan, A. Y. Du, and C. K. Cheng, "Effect of Ta Migration from Sidewall Barrier on Leakage Current in Cu/SiOCH Low-k Dielectrics," Journal of Applied Physics, vol. 106, No. 4, p. 043517, 2009.
M. Gall, K. B. Yeap, and E. Zschech, "Advanced Concepts for TDDB Reliability in Conjunction with 3D Stress," in Proc. AIP Conference, pp. 79-88, 2014.
K. B. Yeap, M. Gall, Z. Liao, C. Sander, U. Muehle, P. Justison, O. Aubel, M. Hauschildt, A. Beyer, N. Vogel, and E. Zschech, "In Situ Study on Low-k Interconnect Time-Dependent-Dielectric-Breakdown Mechanisms," Journal of Applied Physics, vol. 115, No. 12, p. 124101, 2014.
M. Vilmay, D. Roy, C. Besset, D. Galpin, C. Monget, and P. Vannier, "Key Process steps for High Reliable SiOCH Low-k Dielectrics for the sub 45nm technology nodes," in Proc. International Interconnect Technology Conference (IITC), pp. 1-3, 2009.
M. Morgen, E. T. Ryan, J.-H. Zhao, C. Hu, T. Cho, and P. S. Ho, "Low Dielectric Constant Materials for ULSI Interconnects," Annual Review of Materials Science, vol. 30, pp. 645-680, 2000.

* cited by examiner

FULL-CHIP ASSESSMENT OF TIME-DEPENDENT DIELECTRIC BREAKDOWN

RELATED APPLICATIONS

This application claims the benefit of U.S. Provisional Patent Application No. 62/314,663, filed on Mar. 29, 2016, and naming Valeriy Sukharev et al. as inventors, which application is incorporated entirely herein by reference.

FIELD OF THE DISCLOSED TECHNOLOGY

The present disclosed technology relates to integrated circuit design and fabrication technologies. Various implementations of the disclosed technology may be particularly useful for identifying and fixing design problems associated with interconnects.

BACKGROUND OF THE DISCLOSED TECHNOLOGY

With aggressive technology scaling accompanied by employment of new advanced materials, time-dependent di-electric breakdown (TDDB) is becoming the second leading cause of on-chip interconnect failures after electro-migration (EM). In general, the TDDB is a failure mechanism of back-end-of-line interconnects (BEOL). A bridge will form between two interconnect lines when the inter-metal dielectric (IMD) breaks down as a result of long-time application of relatively low electric field. This is different from the hard break-down, which is caused by strong electric field.

The break-down is caused by formation of a conducting path through the IMD oxide between metal lines due to electron tunneling current. It leads to a significant leakage increase that degrades the circuit performance and causes the chip operation failure. Early works on TDDB have been mainly focused on the gate oxide TDDB, caused by the excessive electric fields in thin gate oxides. In contrast, TDDB in the BEOL stacks has not been a concern until recent years, due to wide dielectric spacing between metal lines and high electric strength of the inter-metal silicon dioxide.

This situation has changed with the layout feature dimensions shrink and design complexity growth. The drastically reduced wiring pitches lead to escalating electric fields between interconnects. In order to decrease the RC delay, dynamic power consumption, and cross-talk noise, porous low-k dielectric materials, with the dielectric constant k<3, have been introduced. However, the low-k materials are characterized by poor mechanical, thermal, and electrical properties in comparison with silicon dioxide. Some of the process steps such as chemical mechanical planarization (CMP) and plasma etch can potentially damage the dielectric sub-surfaces regions, generating charge carrier traps and assisting the conduction. As a result, the integrated circuit chips integrated with the copper/low-k interconnects tend to be vulnerable to TDDB failure.

Great efforts have been made to model TDDB degradation. These proposed field acceleration models are based on different TDDB mechanisms. There is no universal agreement among them and the underlying physics of the dielectric breakdown is still not completely defined. The frequently-employed thermochemical E-model (J. McPherson and H. Mogul, "Underlying Physics of the Thermochemical E Model in Describing Low-Field Time-Dependent Dielectric Breakdown in SiO2 Thin Films," Journal of Applied Physics, vol. 84, no. 3, pp. 1513-1523, 1998) and 1/E-model (I. C. Chen, S. Holland, and C. Hu, "A Quantitative Physical Model for Time-Dependent Breakdown in SiO2," in IEEE International Reliability Physics Symposium (IRPS), pp. 26-28, 1985.) were initially developed for gate oxides. The E-model describes weak bond breakage due to thermochemical heating while the 1/E-model refers to high energy hole injection induced damage. These models were later examined toward extension on the copper/low-k interconnect TDDB. The major difference between TDDB in low-k BEOL dielectrics and gate oxides is the presence of metal ions in the former interior.

The $\sqrt{E}$-model, first proposed for metal-SiN-metal capacitors, has been employed for the low-k TDDB, assuming that the copper ions play a major role in dielectric breakdown. (F. Chen et al., "A Comprehensive Study of Low-k SiCOH TDDB Phenomena and Its Reliability Lifetime Model Development," in IEEE International Reliability Physics Symposium (IRPS), pp. 46-53, 2006; and N. Suzumura et al., "A New TDDB Degradation Model Based on Cu Ion Drift in Cu Interconnect Dielectrics," in IEEE International Reliability Physics Symposium (IRPS), pp. 26-30, 2006). Lately, experimental data collected at the low fields have demonstrated the overly conservative predictions generated by the E and $\sqrt{E}$ models, and too optimistic predictions with the 1/E model. (J. W. McPherson, "Time Dependent Dielectric Breakdown Physics-Models Revisited," Microelectronics Reliability, vol. 52, no. 9, pp. 1753-1760, 2012). In addition, even though the break-down event depends on the formation of the conducting path of traps connecting the two electrodes (metal lines), all proposed TDDB models fail to describe the kinetics of conduction path generation. Majority of currently employed TDDB assessment approaches are based on calculations of the across-layout electrostatic fields and, thus, cannot provide any kind of the interconnect lifetime assessment.

A robust full-chip assessment technique for low-k TDDB is needed for evaluating the amount of the inter-metal dielectric degradation measured by the leakage current density and the mean time to failure during the circuit design. The copper/low-k dielectric structures are characterized by a wide variety of geometries. The architecture of a metal line, which includes the capping (etch stop) layer 310 and the diffusion barrier 320 coating the copper bulk as shown in FIG. 3, may impact the TDDB-induced interconnect lifetime. Distribution of the electric field in inter-metal dielectric gaps affects both the kinetics of the current conducting path generation and the resulting leakage current density. One method (Bashir et al., "Backend Low-k TDDB Chip Reliability Simulator," in IEEE International Reliability Physics Symposium (IRPS), pp. 2C.2.1-2C.2.10, 2011.), assumes a fixed voltage drop between all neighboring metal segments in the proposed full-chip TDDB simulator. However, interconnects in the chip can be categorized as power/ground lines and signal lines. Patterns with the same geometries but different power/ground/signal line combinations, e.g. with the different electric loads, will be characterized by different TDDB activities. Thus, this method can lead to too conservative results. Moreover, this method uses only a general formula to model the system lifetime. Novel solutions should be developed to mitigate the mentioned problems for full-chip TDDB assessment.

BRIEF SUMMARY OF THE DISCLOSED TECHNOLOGY

Aspects of the disclosed technology relate to techniques of full-chip assessment of time-dependent dielectric breakdown. In one aspect, there is a method comprising: analyzing a layout design to identify matching patterns that match a pre-calculated pattern in a pattern database, each of pre-calculated patterns in the pattern database having a time-to-failure characteristic value pre-computed based on a model of electric current path generation and evolution which assumes field-based hopping conductivity of current carriers; and determining time-to-failure characteristic values for the matching patterns based on the pre-computed time-to-failure characteristic values and electric attributes of geometric elements in each of the matching patterns.

The method may further comprise: identifying matching patterns most susceptible to time-dependent dielectric breakdown based on the time-to-failure characteristic values; and modifying the layout design to fix the matching patterns most susceptible time-dependent dielectric breakdown.

The electric current path generation and evolution model may be calibrated with experimental data for a particular manufacture process. The electric attributes may comprise voltage information of the geometric elements. Alternatively or additionally, the electric attributes may comprise interconnect types of the geometric elements, the interconnect types comprising power lines, ground lines and signal lines. The determining is further based on geometric attributes of geometric elements in each of the matching patterns.

In another aspect, there are one or more non-transitory computer-readable media storing computer-executable instructions for causing one or more processors to perform the above method.

In still another aspect, there is a system, comprising: one or more processors, the one or more processors programmed to perform the above method.

Certain inventive aspects are set out in the accompanying independent and dependent claims. Features from the dependent claims may be combined with features of the independent claims and with features of other dependent claims as appropriate and not merely as explicitly set out in the claims.

Certain objects and advantages of various inventive aspects have been described herein above. Of course, it is to be understood that not necessarily all such objects or advantages may be achieved in accordance with any particular embodiment of the disclosed technology. Thus, for example, those skilled in the art will recognize that the disclosed technology may be embodied or carried out in a manner that achieves or optimizes one advantage or group of advantages as taught herein without necessarily achieving other objects or advantages as may be taught or suggested herein.

DETAILED DESCRIPTION OF THE DISCLOSED TECHNOLOGY

Figure 1:
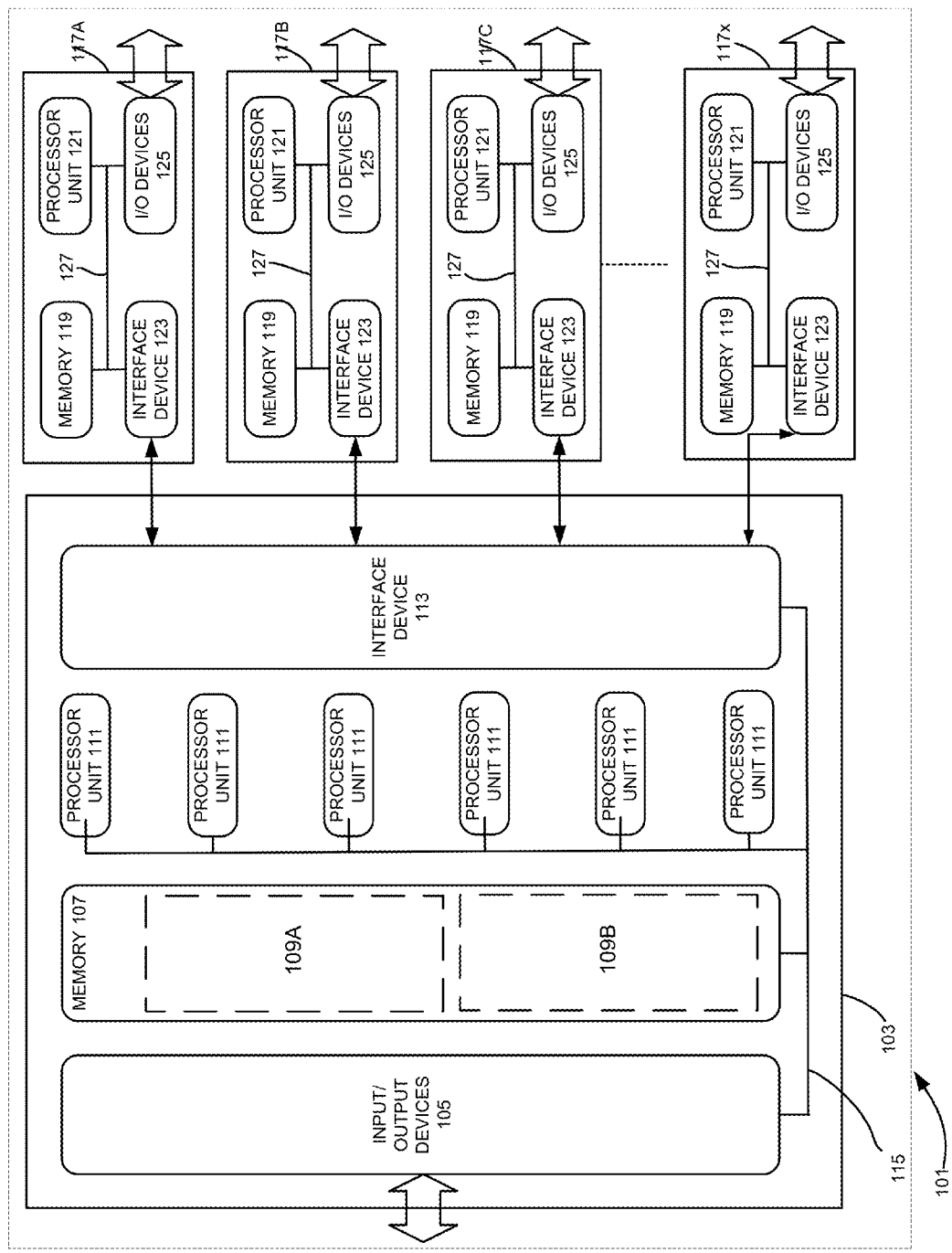
FIG. 1 illustrates an example of a computing system that may be used to implement various embodiments of the disclosed technology.

Various aspects of the present disclosed technology relate to techniques of full-chip assessment of time-dependent dielectric breakdown. In the following description, numerous details are set forth for purpose of explanation. However, one of ordinary skill in the art will realize that the disclosed technology may be practiced without the use of these specific details. In other instances, well-known features have not been described in detail to avoid obscuring the present disclosed technology.

Although the operations of some of the disclosed methods, apparatus, and systems are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods, apparatus, and systems can be used in conjunction with other methods, apparatus, and systems. Additionally, the description sometimes uses terms like "analyze" and "determine" to describe the disclosed methods. These terms are high-level abstractions of the actual operations that are performed. The actual operations that correspond to these terms may vary depending on the particular implementation and are readily discernible by one of ordinary skill in the art.

Any of the disclosed techniques can be implemented in whole or in part by software comprising computer-executable instructions stored on computer-readable media. Such software can comprise, for example, an appropriate electronic design automation ("EDA") software tool. Such software can be executed on a single computer or on a networked computer (e.g., via the Internet, a wide-area network, a local-area network, a client-server network, or other such network). For clarity, only certain selected aspects of the software-based implementations are described. Other details that are well known in the art are omitted. For example, it should be understood that the disclosed technology is not limited to any specific computer language, program, or computer. For example, the disclosed technology can be implemented using any commercially available computer executing a program written in any commercially available or otherwise suitable language. Any of the disclosed methods can alternatively be implemented (partially or completely) in hardware (e.g., an ASIC, PLD, or SoC).

Any data produced from any of the disclosed methods (e.g., intermediate or final test patterns, test patterns values, or control data) can be stored on computer-readable media (e.g., tangible computer-readable media, such as one or more CDs, volatile memory components (such as DRAM or SRAM), or nonvolatile memory components (such as hard drives)) using a variety of different data structures or formats. Such data can be created, updated, or stored using a local computer or over a network (e.g., by a server computer).

As used in this disclosure, the singular forms "a," "an," and "the" include the plural forms unless the context clearly dictates otherwise. Additionally, the term "includes" means "comprises." Moreover, the term "design" is intended to encompass data describing an entire microdevice, such as an integrated circuit device or micro-electromechanical system (MEMS) device. This term also is intended to encompass a smaller group of data describing one or more components of an entire microdevice, however, such as a layer of an integrated circuit device, or even a portion of a layer of an integrated circuit device.

Still further, the term "design" also is intended to encompass data describing more than one microdevice, such as data to be used to create a mask or reticle for simultaneously forming multiple microdevices on a single wafer. The layout design data may be in any desired format, such as, for example, the Graphic Data System II (GDSII) data format or the Open Artwork System Interchange Standard (OASIS) data format proposed by Semiconductor Equipment and Materials International (SEMI). Other formats include an open source format named Open Access, Milkyway by Synopsys, Inc., and EDDM by Mentor Graphics, Inc.

Illustrative Operating Environment

The execution of various electronic design automation processes according to embodiments of the disclosed technology may be implemented using computer-executable software instructions executed by one or more programmable computing devices. Because these embodiments of the disclosed technology may be implemented using software instructions, the components and operation of a generic programmable computer system on which various embodiments of the disclosed technology may be employed will first be described. Further, because of the complexity of some electronic design automation processes and the large size of many circuit designs, various electronic design automation tools are configured to operate on a computing system capable of simultaneously running multiple processing threads. The components and operation of a computer network having a host or master computer and one or more remote or servant computers therefore will be described with reference to FIG. 1. This operating environment is only one example of a suitable operating environment, however, and is not intended to suggest any limitation as to the scope of use or functionality of the disclosed technology.

In FIG. 1, the computer network 101 includes a master computer 103. In the illustrated example, the master computer 103 is a multi-processor computer that includes a plurality of input and output devices 105 and a memory 107. The input and output devices 105 may include any device for receiving input data from or providing output data to a user. The input devices may include, for example, a keyboard, microphone, scanner or pointing device for receiving input from a user. The output devices may then include a display monitor, speaker, printer or tactile feedback device. These devices and their connections are well known in the art, and thus will not be discussed at length here.

The memory 107 may similarly be implemented using any combination of computer readable media that can be accessed by the master computer 103. The computer readable media may include, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable media may also include magnetic cassettes, magnetic tapes, magnetic disks or other magnetic storage devices, punched media, holographic storage devices, or any other medium that can be used to store desired information.

As will be discussed in detail below, the master computer 103 runs a software application for performing one or more operations according to various examples of the disclosed technology. Accordingly, the memory 107 stores software instructions 109A that, when executed, will implement a software application for performing one or more operations. The memory 107 also stores data 109B to be used with the software application. In the illustrated embodiment, the data 109B contains process data that the software application uses to perform the operations, at least some of which may be parallel.

The master computer 103 also includes a plurality of processor units 111 and an interface device 113. The processor units 111 may be any type of processor device that can be programmed to execute the software instructions 109A, but will conventionally be a microprocessor device. For example, one or more of the processor units 111 may be a commercially generic programmable microprocessor, such as Intel® Pentium® or Xeon™ microprocessors, Advanced Micro Devices Athlon™ microprocessors or Motorola 68K/Coldfire® microprocessors. Alternately or additionally, one or more of the processor units 111 may be a custom-manufactured processor, such as a microprocessor designed to optimally perform specific types of mathematical operations. The interface device 113, the processor units 111, the memory 107 and the input/output devices 105 are connected together by a bus 115.

Figure 2:
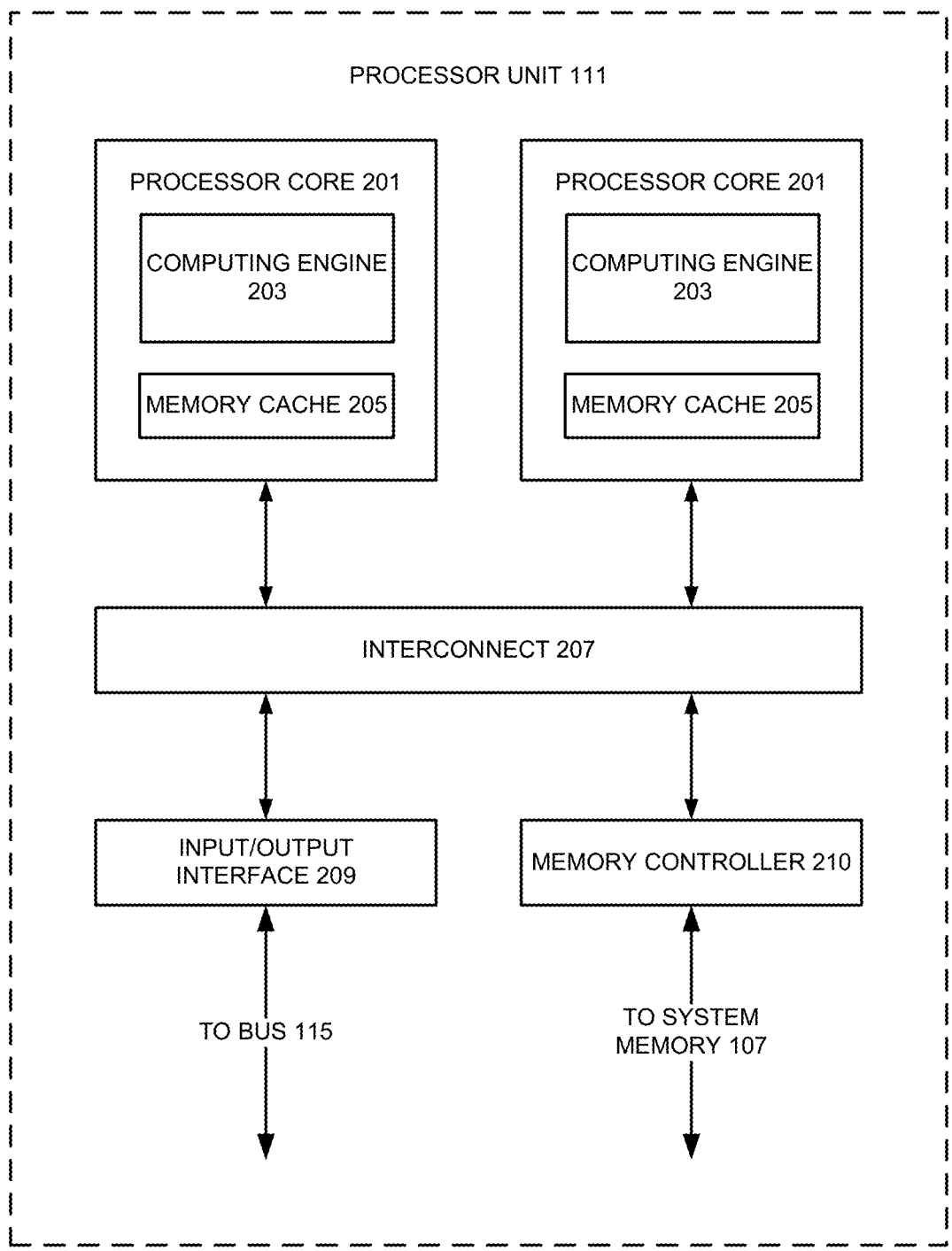
FIG. 2 illustrates an example of a multi-core processor unit that may be used to implement various embodiments of the disclosed technology.

With some implementations of the disclosed technology, the master computing device 103 may employ one or more processing units 111 having more than one processor core. Accordingly, FIG. 2 illustrates an example of a multi-core processor unit 111 that may be employed with various embodiments of the disclosed technology. As seen in this figure, the processor unit 111 includes a plurality of processor cores 201. Each processor core 201 includes a computing engine 203 and a memory cache 205. As known to those of ordinary skill in the art, a computing engine contains logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 203 may then use its corresponding memory cache 205 to quickly store and retrieve data and/or instructions for execution.

Each processor core 201 is connected to an interconnect 207. The particular construction of the interconnect 207 may vary depending upon the architecture of the processor unit 111. With some processor cores 201, such as the Cell microprocessor created by Sony Corporation, Toshiba Corporation and IBM Corporation, the interconnect 207 may be implemented as an interconnect bus. With other processor units 111, however, such as the Opteron™ and Athlon™ dual-core processors available from Advanced Micro Devices of Sunnyvale, Calif., the interconnect 207 may be implemented as a system request interface device. In any case, the processor cores 201 communicate through the interconnect 207 with an input/output interface 209 and a memory controller 210. The input/output interface 209 provides a communication interface between the processor unit 111 and the bus 115. Similarly, the memory controller 210 controls the exchange of information between the processor unit 111 and the system memory 107. With some implementations of the disclosed technology, the processor units 111 may include additional components, such as a high-level cache memory accessible shared by the processor cores 201.

While FIG. 2 shows one illustration of a processor unit 111 that may be employed by some embodiments of the disclosed technology, it should be appreciated that this illustration is representative only, and is not intended to be limiting. Also, with some implementations, a multi-core processor unit 111 can be used in lieu of multiple, separate processor units 111. For example, rather than employing six separate processor units 111, an alternate implementation of the disclosed technology may employ a single processor unit 111 having six cores, two multi-core processor units each having three cores, a multi-core processor unit 111 with four cores together with two separate single-core processor units 111, etc.

Returning now to FIG. 1, the interface device 113 allows the master computer 103 to communicate with the servant computers 117A, 117B, 117C . . . 117x through a communication interface. The communication interface may be any suitable type of interface including, for example, a conventional wired network connection or an optically transmissive wired network connection. The communication interface may also be a wireless connection, such as a wireless optical connection, a radio frequency connection, an infrared connection, or even an acoustic connection. The interface device 113 translates data and control signals from the master computer 103 and each of the servant computers 117 into network messages according to one or more communication protocols, such as the transmission control protocol (TCP), the user datagram protocol (UDP), and the Internet protocol (IP). These and other conventional communication protocols are well known in the art, and thus will not be discussed here in more detail.

Each servant computer 117 may include a memory 119, a processor unit 121, an interface device 123, and, optionally, one more input/output devices 125 connected together by a system bus 127. As with the master computer 103, the optional input/output devices 125 for the servant computers 117 may include any conventional input or output devices, such as keyboards, pointing devices, microphones, display monitors, speakers, and printers. Similarly, the processor units 121 may be any type of conventional or custom-manufactured programmable processor device. For example, one or more of the processor units 121 may be commercially generic programmable microprocessors, such as Intel® Pentium® or Xeon™ microprocessors, Advanced Micro Devices Athlon™ microprocessors or Motorola 68K/Coldfire® microprocessors. Alternately, one or more of the processor units 121 may be custom-manufactured processors, such as microprocessors designed to optimally perform specific types of mathematical operations. Still further, one or more of the processor units 121 may have more than one core, as described with reference to FIG. 2 above. For example, with some implementations of the disclosed technology, one or more of the processor units 121 may be a Cell processor. The memory 119 then may be implemented using any combination of the computer readable media discussed above. Like the interface device 113, the interface devices 123 allow the servant computers 117 to communicate with the master computer 103 over the communication interface.

In the illustrated example, the master computer 103 is a multi-processor unit computer with multiple processor units 111, while each servant computer 117 has a single processor unit 121. It should be noted, however, that alternate implementations of the disclosed technology may employ a master computer having single processor unit 111. Further, one or more of the servant computers 117 may have multiple processor units 121, depending upon their intended use, as previously discussed. Also, while only a single interface device 113 or 123 is illustrated for both the master computer 103 and the servant computers, it should be noted that, with alternate embodiments of the disclosed technology, either the computer 103, one or more of the servant computers 117, or some combination of both may use two or more different interface devices 113 or 123 for communicating over multiple communication interfaces.

With various examples of the disclosed technology, the master computer 103 may be connected to one or more external data storage devices. These external data storage devices may be implemented using any combination of computer readable media that can be accessed by the master computer 103. The computer readable media may include, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable media may also include magnetic cassettes, magnetic tapes, magnetic disks or other magnetic storage devices, punched media, holographic storage devices, or any other medium that can be used to store desired information. According to some implementations of the disclosed technology, one or more of the servant computers 117 may alternately or additionally be connected to one or more external data storage devices. Typically, these external data storage devices will include data storage devices that also are connected to the master computer 103, but they also may be different from any data storage devices accessible by the master computer 103.

It also should be appreciated that the description of the computer network illustrated in FIG. 1 and FIG. 2 is provided as an example only, and it not intended to suggest any limitation as to the scope of use or functionality of alternate embodiments of the disclosed technology.

Layout Design

Electronic circuits, such as integrated microcircuits, are used in a variety of products, from automobiles to microwaves to personal computers. Designing and fabricating microcircuit devices typically involves many steps, sometimes referred to as the "design flow." The particular steps of a design flow often are dependent upon the type of microcircuit, its complexity, the design team, and the microcircuit fabricator or foundry that will manufacture the microcircuit. Typically, software and hardware "tools" verify the design at various stages of the design flow by running software simulators and/or hardware emulators. These steps aid in the discovery of errors in the design, and allow the designers and engineers to correct or otherwise improve the design. These various microcircuits are often referred to as integrated circuits (IC's).

Several steps are common to most design flows. Initially, the specification for a new circuit is transformed into a logical design, sometimes referred to as a register transfer level (RTL) description of the circuit. With this logical design, the circuit is described in terms of both the exchange of signals between hardware registers and the logical operations that are performed on those signals. The logical design typically employs a Hardware Design Language (HDL), such as the Very high speed integrated circuit Hardware Design Language (VHDL). The logic of the circuit is then analyzed, to confirm that it will accurately perform the functions desired for the circuit. This analysis is sometimes referred to as "functional verification."

After the accuracy of the logical design is confirmed, it is converted into a device design by synthesis software. The device design, which is typically in the form of a schematic or netlist, describes the specific electronic devices (such as transistors, resistors, and capacitors) that will be used in the circuit, along with their interconnections. This device design generally corresponds to the level of representation displayed in conventional circuit diagrams. The relationships between the electronic devices are then analyzed, to confirm that the circuit described by the device design will correctly perform the desired functions. This analysis is sometimes referred to as "formal verification." Additionally, preliminary timing estimates for portions of the circuit are often made at this stage, using an assumed characteristic speed for each device, and incorporated into the verification process.

Once the components and their interconnections are established, the design is again transformed, this time into a physical design that describes specific geometric elements. This type of design often is referred to as a "layout" design. The geometric elements, which typically are polygons, define the shapes that will be created in various layers of material to manufacture the circuit. Typically, a designer will select groups of geometric elements representing circuit device components (e.g., contacts, channels, gates, etc.) and place them in a design area. These groups of geometric elements may be custom designed, selected from a library of previously-created designs, or some combination of both. Lines are then routed between the geometric elements, which will form the wiring used to interconnect the electronic devices. Layout tools (often referred to as "place and route" tools), such as Mentor Graphics' IC Station or Cadence's Virtuoso, are commonly used for both of these tasks.

IC layout descriptions can be provided in many different formats. The Graphic Data System II (GDSII) format is a popular format for transferring and archiving two-dimensional graphical IC layout data. Among other features, it contains a hierarchy of structures, each structure containing layout elements (e.g., polygons, paths or poly-lines, circles and textboxes). Other formats include an open source format named Open Access, Milkyway by Synopsys, Inc., EDDM by Mentor Graphics, Inc., and the more recent Open Artwork System Interchange Standard (OASIS) proposed by Semiconductor Equipment and Materials International (SEMI). These various industry formats are used to define the geometrical information in IC layout designs that are employed to manufacture integrated circuits. Once the microcircuit device design is finalized, the layout portion of the design can be used by fabrication tools to manufacture the device using a photolithographic process.

Electric Path Generation and Evolution Model for TDDB

Inter-layer dielectric (ILD) and inter-metal dielectric (IMD) are the two types of low-k dielectrics, which represent the isolation between two metal layers and between metal lines in the same layer, respectively. Because the thickness of ILD is generally larger than the metal lines space, the breakdown of dielectrics between metal lines located in the same layer are more vulnerable to breakdown. The reported experiments demonstrate that TDDB failures take place mostly at the interface between the capping layer and the low-k dielectrics.

Figure 3:
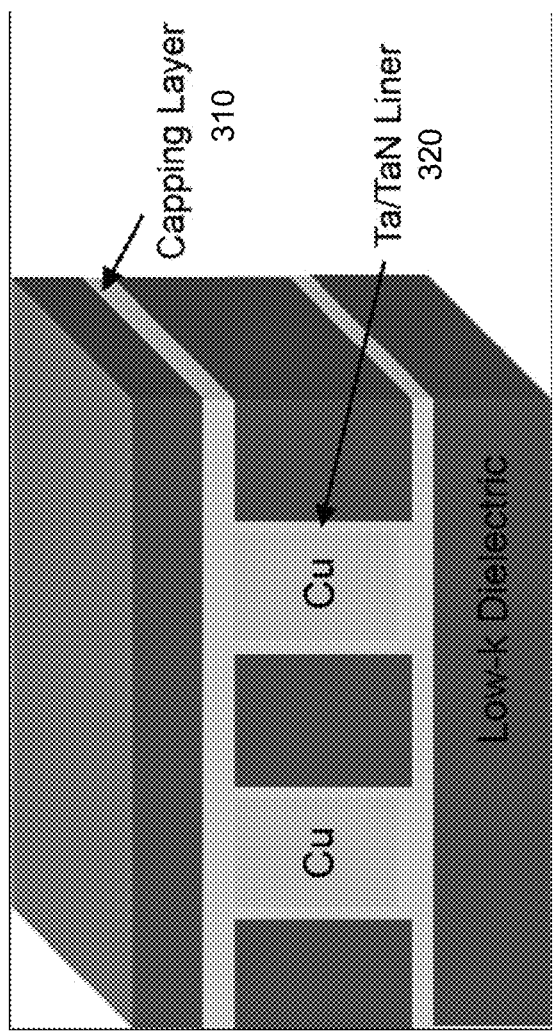
FIG. 3 illustrates an example of the architecture of a metal line, which includes the capping (etch stop) layer and the diffusion barrier coating the copper bulk.
Figure 4A:
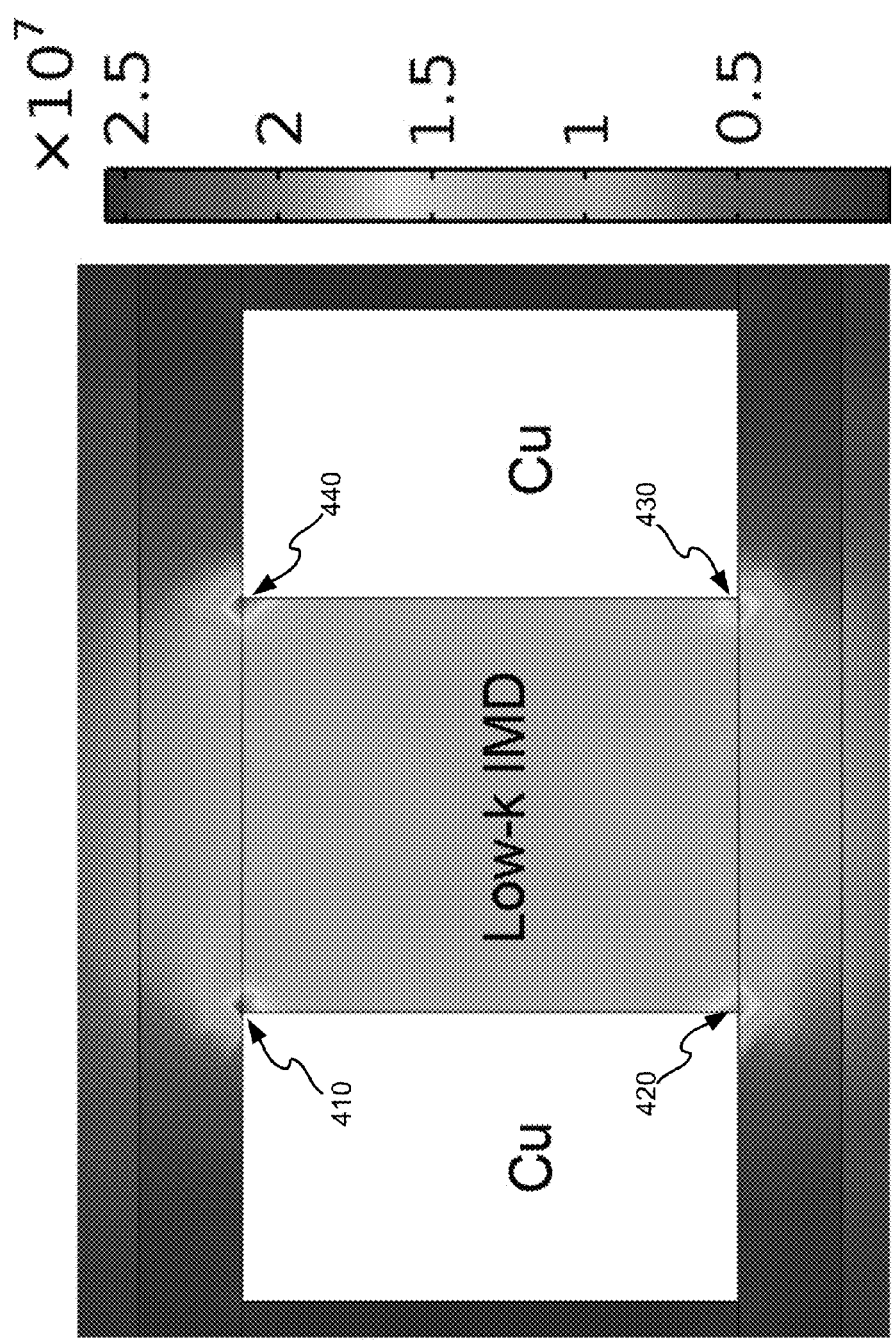
FIG. 4A illustrates an example of the distribution of electrostatic field in the geometry shown in FIG. 3 simulated using the COMSOL Multiphysics FEA tool.
Figure 4B:
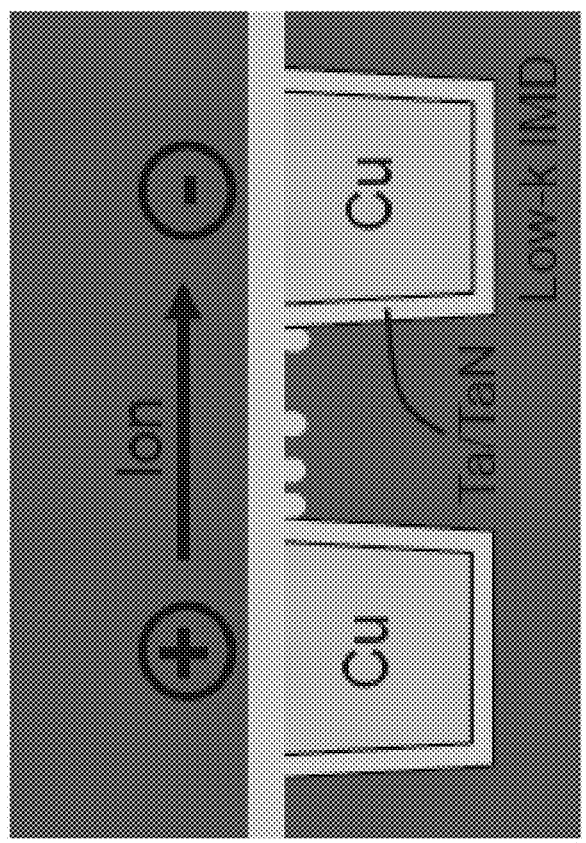
FIG. 4B illustrates ions diffusing mainly at the interface rather than in the bulk dielectric.

The distribution of electrostatic field in the geometry shown in FIG. 3 is simulated using the COMSOL Multiphysics FEA tool. The result is illustrated in FIG. 4A, which demonstrates the electric field enhancement near the cap/inter-metal dielectric interface (regions 410-440). Besides, the ions are reported to diffuse much faster at the interface than in the bulk dielectric, as illustrated in FIG. 4B. This is possibly due to the defects generated at the surface during CMP process. Based on these findings, 2D diffusion of the metal ions along the cap/IMD interface between the oppositely charged metal lines is the focus of the following analysis.

The effect of copper ions on the intra line leakage is debated in the literature. Recently, a number of experimental results have reported that Cu can hardly diffuse out of the Ta/TaN barrier under chip operating conditions. Instead, Ta ion diffusion has been observed in the low-k materials. The diffusion of metal ions can generate defects in the dielectric serving as potential centers for localization of the electrons coming from the metal electrodes. An electric conductivity is represented by electron jumps between neighboring centers (hopping conductivity). The local conductivity is proportional to the probability of the electron jumping between the neighbor centers, which exponentially depends on the distance between the centers:

$$\sigma_{ij} \sim \Gamma_{ij} = \gamma_{ij}^0 \exp\left\{-\frac{2r_{ij}}{a} - \frac{\varepsilon_{ij}}{k_B T}\right\} \quad (1)$$

Here, $r_{ij}$ is the distance between i and j centers, a is the radius of electron localization at this type of centers (analog of the Bohr's radius), which can reach 100, $\varepsilon_{ij}$ is the energy barrier between centers, $k_B T$ is the thermal energy. All connected centers form the resistors network, with the resistor between i and j centers equals to:

$$R_{ij} = R_{ij}^0 \exp\left\{\frac{2r_{ij}}{a} + \frac{\varepsilon_{ij}}{k_B T}\right\} \quad (2)$$

In a 2-D system, the distance $r_{ij}$ is determined by:

$$r_{ij} = N(x, y, t)^{-\frac{1}{2}} \quad (3)$$

where N(x,y,t) is the ion concentration at the considered interface.

Figure 5:
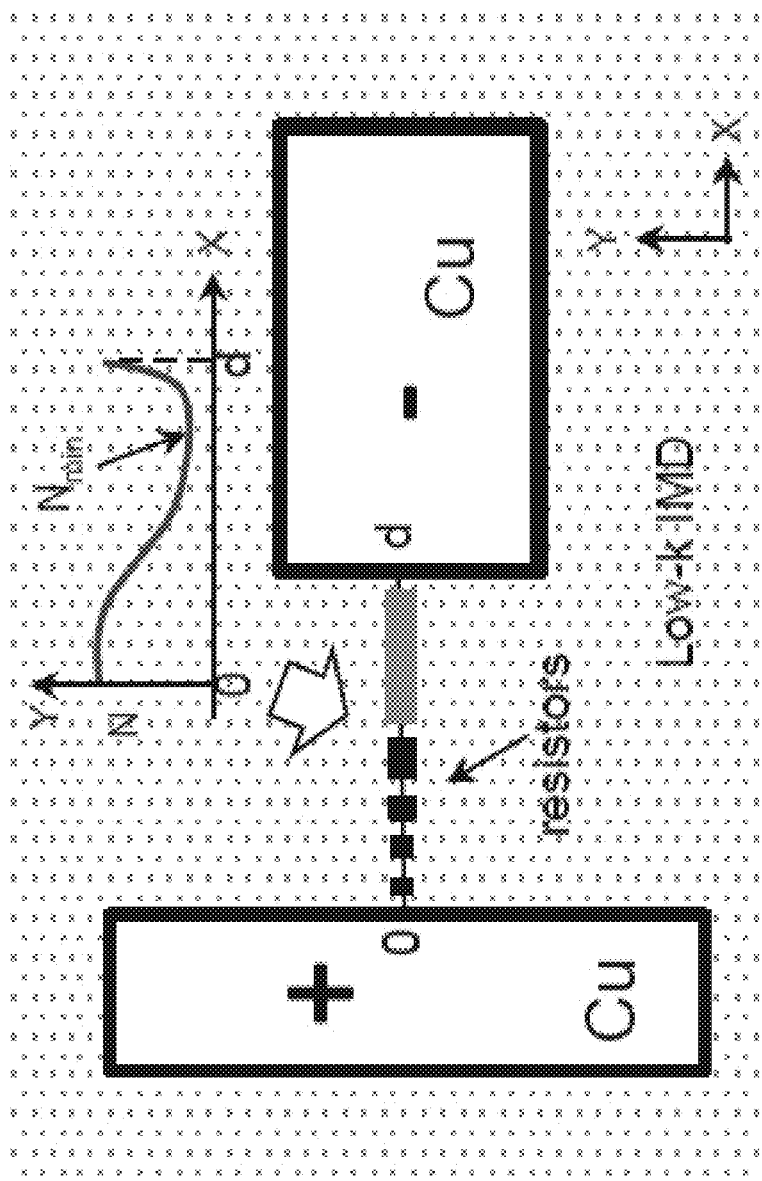
FIG. 5 illustrates an example of the schematics of ion concentration distribution and the corresponding resistor network at an arbitrary instant in time in inter-metal dielectric along a path (0, d) connecting metal electrodes.

FIG. 5 shows the schematics of the distribution of ion concentration and the corresponding resistor network at an arbitrary instant in time in inter-metal dielectric along a path (0, d) connecting metal electrodes. Because the resistance follows an exponential decrease with the distance between centers, the total resistance of the path (0, d) depends mainly on the largest resistor, i.e. the minimum ion concentration. The distribution of the normalized ion concentration $N_{norm}$ (x,y,t)=N(x,y,t)/$N_0$ is governed by the diffusion of ions in an electric field:

$$\frac{\partial N_{norm}}{\partial t} = -\nabla J \quad (4)$$

$$J = -D\nabla N_{norm} + \frac{qDEN_{norm}}{k_B T} \quad (5)$$

with boundary conditions:

$$N_{norm}(x=0)=N_{norm}(x=d)=1 \quad (6)$$

Here J is the metal flux, $D=D_0 \exp(-E_a/k_B T)$ is the diffusion coefficient, $E_a$ is the activation energy for metal ion diffusion, $k_B$ is the Boltzmann constant, T is the temperature, q is the electric charge and E is the electric field.

Metal line structure shown in FIG. 5 is used as an example for simulating the electric path generation. Time-dependent distribution of the metal ions is obtained from the COMSOL-based solution of the coupled electric field and diffusion equations (4)-(6). The employed parameter values are listed in Table 1.

TABLE 1

Parameters used in FEA simulation

| Parameter | Value | Parameter | Value |
|---|---|---|---|
| $D_0$ | 2 × 10⁻¹¹ m²/s | $E_a$ | 0.9 eV |
| k | 2.9 | $k_B$ | 1.38 × 10⁻²³ J/K |
| T | 333 K | $V_{DD}$ | 1.1 V |

Figure 6:
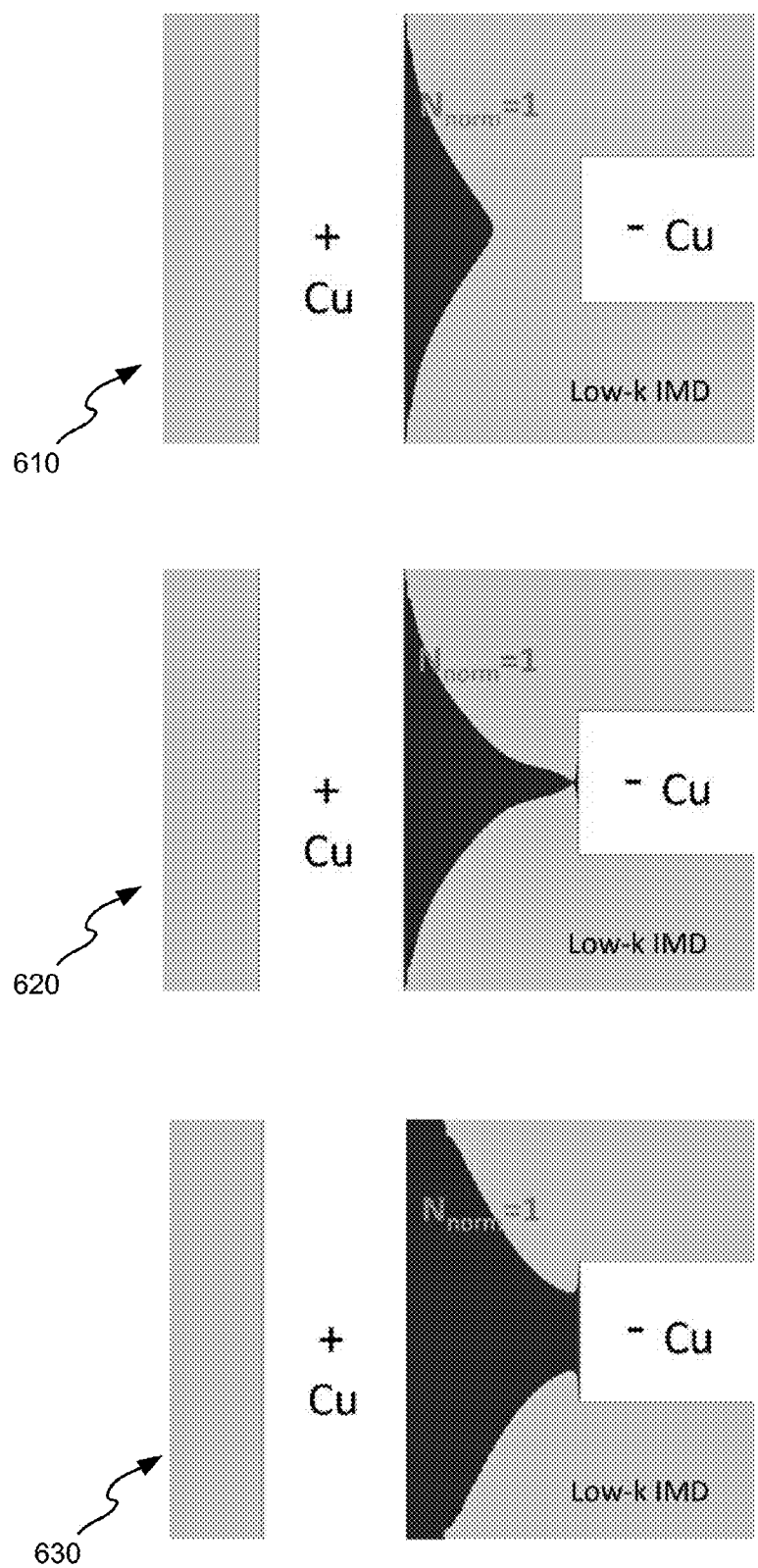
FIG. 6 illustrates an example of three contour lines representing the evolution of the concentration field $N_{norm}$ (x,y,t) at three instances in time, respectively.
Figure 7:
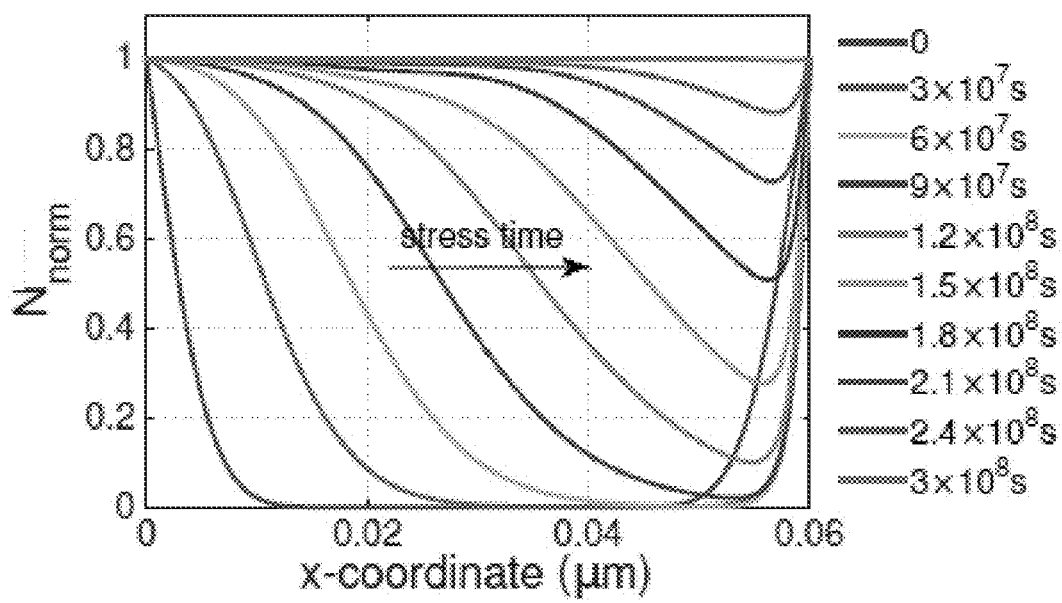
FIG. 7 illustrates an example of evolution of the ion distribution along the fastest diffusion path, which is the path connecting the centers of the neighboring metal lines.
Figure 8:
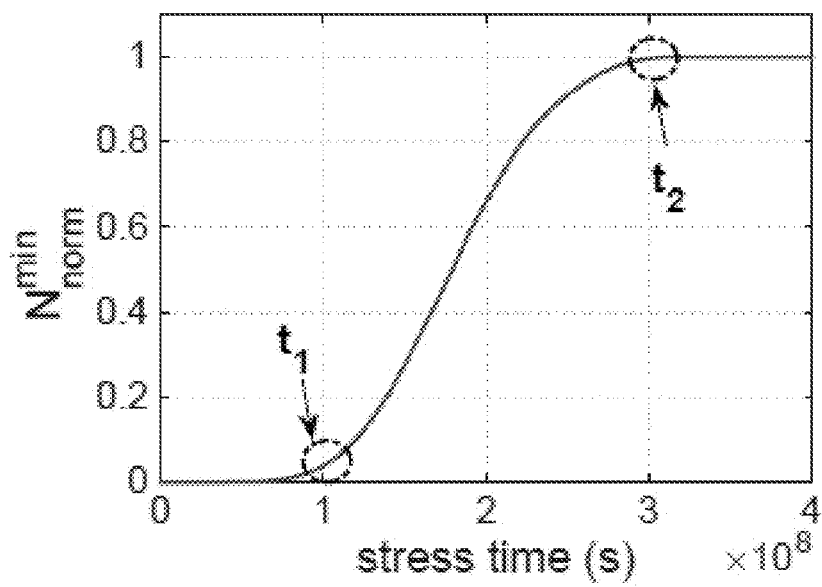
FIG. 8 illustrates the curve of ion concentration vs. time for the example shown in FIG. 7.

Before applying the electric field stressing, the metal atoms are allowed to diffuse into the dielectric for a short period of time at high temperatures (T=400K and t=1e5s in this case). This step should mimic the atomic thermal diffusion, which occurs at the high temperature processing steps including annealing. The simulation results are demonstrated in FIG. 6. Curves 610-630 show the contour lines representing the evolution of the concentration field $N_{norm}$ (x,y,t) at three instances in time, respectively: before a continuous chain of ions characterized by the minimum spacing ($N_{norm}$=1) is formed between metal lines, at the moment when this chain is formed for the first time, and at longer time when the area with $N_{norm}$=1 is expanded along the anode edge. Evolution of the ion distribution along the fastest diffusion path, which is the path connecting the centers of the neighboring metal lines, is shown in FIG. 7. It can be seen that the initial ion distribution, which was resulted by the thermal diffusion, is shifting as a whole with the duration of time toward the anode keeping unchanged the minimum concentration $N_{norm}^{min}$, which is determined by the most separated ions. Simultaneously, the increasingly larger area is occupied with the closed packed ions: $N_{norm}$=1. It lasts until the instance in time when the region with $N_{norm}^{min}$=1 reaches the vicinity of anode edge. Starting from this moment $t_1$, the minimum concentration increases drastically. Finally, the ion concentration becomes uniformly distributed with $N_{norm}$=1 between the electrodes. Based on this observation, two important time instances $t_1$ and $t_2$ are introduced as shown in FIG. 8: $t_1$—The instance in time when $N_{norm}^{min}$ starts to increase (drastically) and $t_2$—The instance in time when $N_{norm}^{min}$ reached 1 and the resistivity is uniformly distributed between electrodes.

Since the largest resistor, corresponding to $N_{norm}^{min}$, dominates the total resistance of the leakage path, the dielectric will start to degrade from $t_1$, leading to significant increase in leakage current. After the instance in time $t_2$, other mechanisms governed by excessive Joule heating will generate the catastrophic dielectric failure. Therefore, the instance in time $t_2$ may be used as a time-to-failure characteristic value to represent the time-to-failure (TTF) of the low-k dielectric in this particular metal gap.

The leakage current evolution may be formulized based on the developed model of the electric path generation and evolution. As it was mentioned above, the neighboring ions characterized by the largest separation provides the largest "resistivity" for the electrons hopping between metal ions. Assuming that the potential barriers between neighboring centers do not depend on the distance between them ("$\varepsilon_{ij}=\varepsilon$"), and accepting the Poole-Frenkel mechanism of the field-induced barrier lowering, the current density evolution can be expressed as:

$$j(t) = j_0 E \exp\left\{-\frac{2}{a\sqrt{N_{norm}^{min}(t) \cdot N_0}} - \frac{\varepsilon - q\sqrt{qE/(\pi\varepsilon_{perm})}}{k_B T}\right\} \quad (7)$$

Here, $\varepsilon_{perm}$ is the dielectric dynamic permittivity. The total leakage current can be obtained by integration of leakage current density over the whole shape contour. The model may be calibrated with a set of experimental data for a particular manufacture process.

TDDB Assessment Tool

Figure 9:
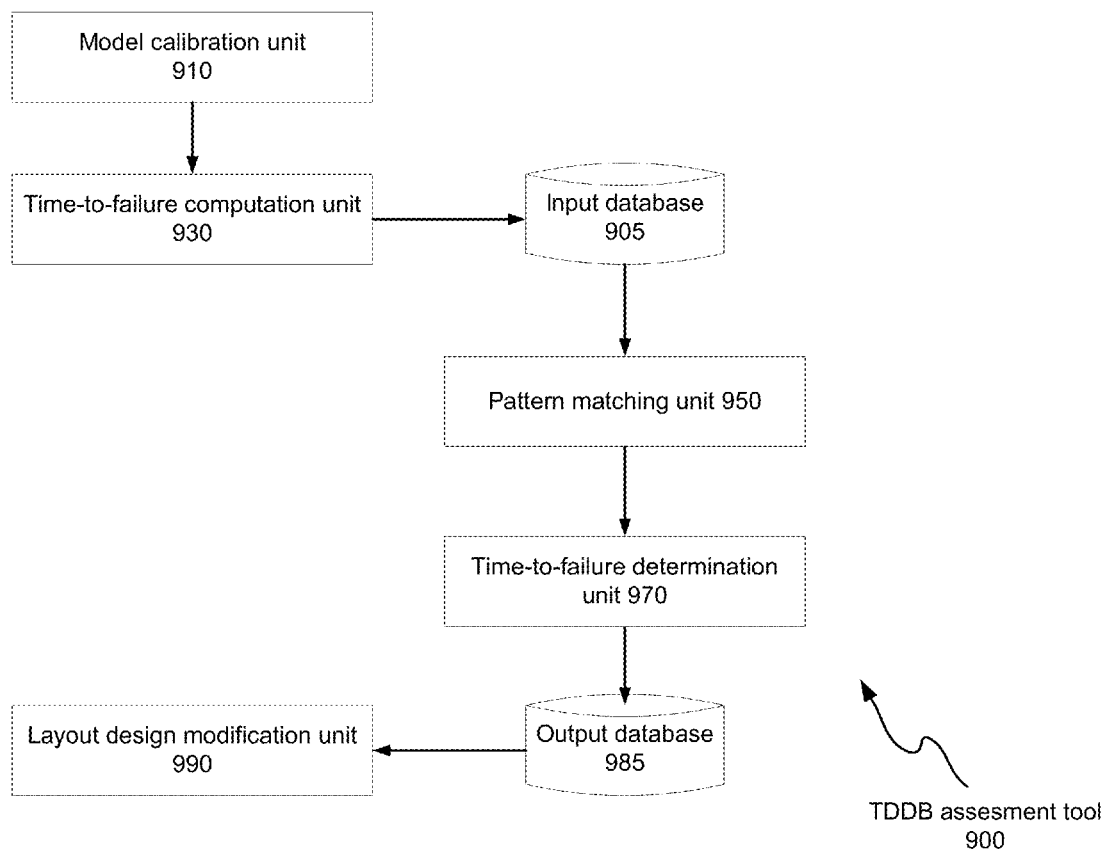
FIG. 9 illustrates an example of a TDDB assessment tool 900 that may be implemented according to various embodiments of the disclosed technology.

FIG. 9 illustrates an example of a TDDB assessment tool 900 that may be implemented according to various embodiments of the disclosed technology. As seen in this figure, the TDDB assessment tool 900 includes a pattern matching unit 950 and a time-to-failure determination unit 970. Some implementations of the pattern matching tool 400 may cooperate with (or incorporate) one or more of a model calibration unit 910, a time-to-flight computation unit 930, a layout design modification unit 990, an input database 905 and an output database 985.

As will be discussed in more detail below, the model calibration unit 910 uses experimental data for a particular manufacture process to calibrate a model of electric current path generation and evolution which assumes field-based hoping conductivity of current carriers. The time-to-flight computation unit 930 computes time-to-failure characteristic values for pre-calculated patterns in a pattern database based on the model of electric current path generation and evolution. The pattern matching unit 950 analyzes a layout design to identify matching patterns that match one of the pre-calculated patterns. The time-to-failure determination unit 970 determines time-to-failure characteristic values for the matching patterns based on the pre-computed time-to-failure characteristic values and electric attributes of geometric elements in each of the matching patterns. The layout design modification unit 990 may modifies the layout design to fix the matching patterns most susceptible time-dependent dielectric breakdown. The layout design and the pattern database along with the pre-computed time-to-failure characteristic values may be stored in the input database 905. The matching patterns may be stored in the output database 985.

As previously noted, various examples of the disclosed technology may be implemented by one or more computing systems, such as the computing system illustrated in FIGS. 1 and 2. Accordingly, one or more of the pattern matching unit 950, the time-to-failure determination unit 970, the model calibration unit 910, the time-to-flight computation unit 930, and the layout design modification unit 990 may be implemented by executing programming instructions on one or more processors in one or more computing systems, such as the computing system illustrated in FIGS. 1 and 2. Correspondingly, some other embodiments of the disclosed technology may be implemented by software instructions, stored on a non-transitory computer-readable medium, for instructing one or more programmable computers/computer systems to perform the functions of one or more of the pattern matching unit 950, the time-to-failure determination unit 970, the model calibration unit 910, the time-to-flight computation unit 930, and the layout design modification unit 990. As used herein, the term "non-transitory computer-readable medium" refers to computer-readable medium that are capable of storing data for future retrieval, and not propagating electro-magnetic waves. The non-transitory computer-readable medium may be, for example, a magnetic storage device, an optical storage device, or a solid state storage device.

It should also be appreciated that, while the pattern matching unit 950, the time-to-failure determination unit 970, the model calibration unit 910, the time-to-flight computation unit 930, and the layout design modification unit 990 are shown as separate units in FIG. 9, a single computer (or a single processor within a master computer) or a single computer system may be used to implement all of these units at different times, or components of these units at different times.

With various examples of the disclosed technology, the input database 905 and the output database 985 may be implemented using any suitable computer readable storage device. That is, either of the input database 905 and the output database 985 may be implemented using any combination of computer readable storage devices including, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable storage devices may also include magnetic cassettes, magnetic tapes, magnetic disks or other magnetic storage devices, holographic storage devices, or any other non-transitory storage medium that can be used to store desired information. While the input database 905 and the output database 985 are shown as separate units in FIG. 9, a single data storage medium may be used to implement some or all of these databases.

Full-Chip TDDB Analysis

Figure 10:
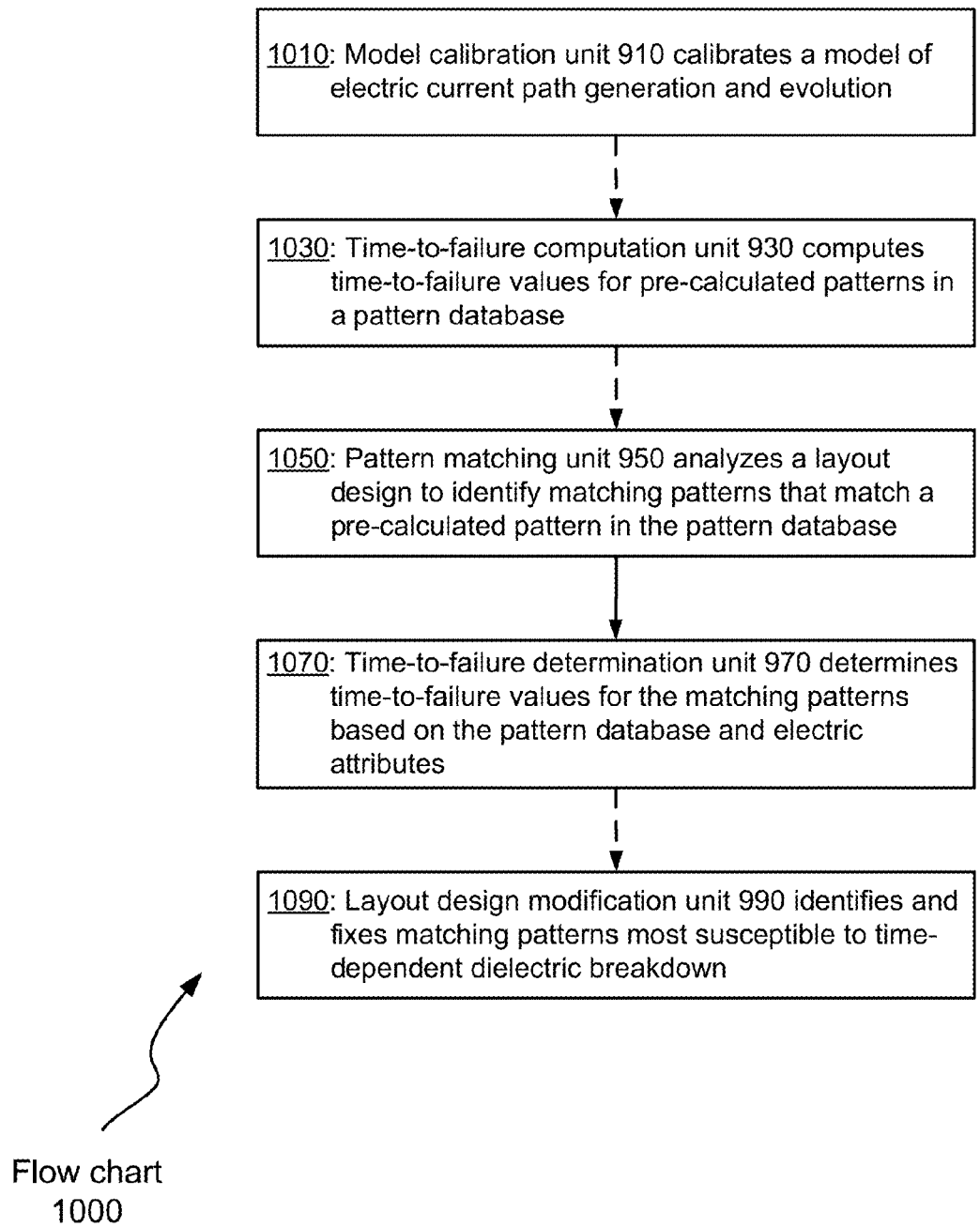
FIG. 10 illustrates a flowchart 1000 showing a process of full-chip assessment of time-dependent dielectric breakdown that may be implemented according to various examples of the disclosed technology.

FIG. 10 illustrates a flowchart 1000 showing a process of full-chip assessment of time-dependent dielectric breakdown that may be implemented according to various examples of the disclosed technology. In the flowchart 1000, operations 1010, 1030 and 1090 are optional operations, indicated by dotted arrow lines. For ease of understanding, methods of full-chip assessment of time-dependent dielectric breakdown that may be employed according to various embodiments of the disclosed technology will be described with reference to the TDDB assessment tool 900 in FIG. 9 and the flow chart 1000 illustrated in FIG. 10. It should be appreciated, however, that alternate implementations of a TDDB assessment tool 900 may be used to perform the methods of full-chip assessment of time-dependent dielectric breakdown illustrated by the flow chart 1000 according to various embodiments of the disclosed technology. Likewise, the TDDB assessment tool 900 may be employed to perform other methods of full-chip assessment of time-dependent dielectric breakdown according to various embodiments of the disclosed technology.

In operation 1010, the model calibration unit 910 calibrating a model of electric current path generation and evolution. The model of electric current path generation and evolution is discussed in detail in the section of electric path generation and evolution model for TDDB. This model is based on the development of conduction path in the dielectric between electrodes described by the redistribution of defects (ions). The redistribution may be captured by a finite element analysis (FEA)-based solution of a coupled electrostatic and charging particle diffusion problem. The resolved evolution of the minimum ion concentration between metal lines may be used to determine the time-to-breakdown characteristics of the dielectric. Conventional models fail to consider the kinetics of conduction path generation and evolution.

Figure 11A:
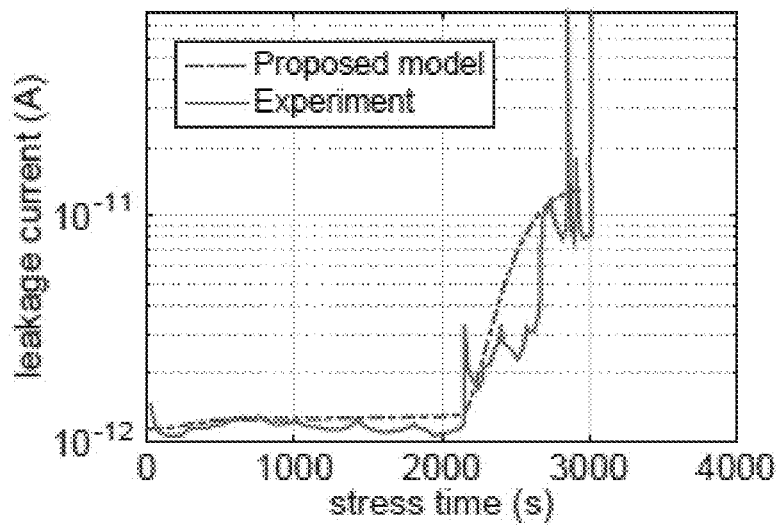
FIG. 11A shows an example of a comparison of leakage current evolution over time under constant voltage stress computed using a calibrated model with experimental data.
Figure 11B:
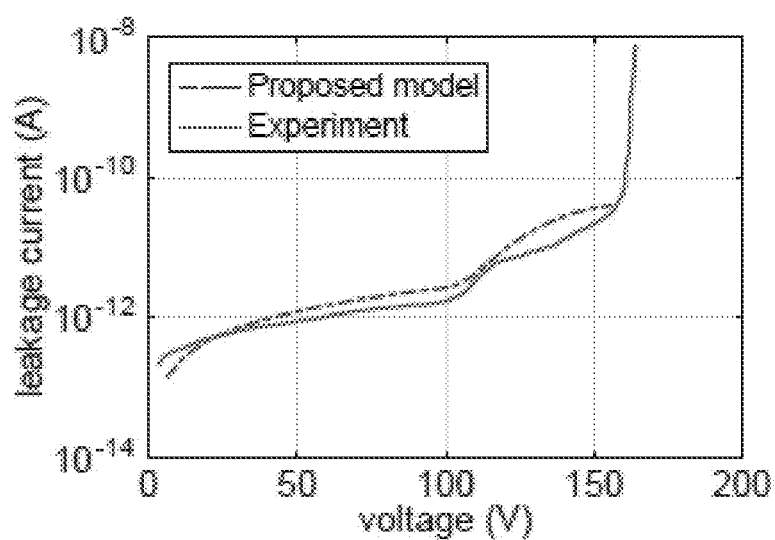
FIG. 11B shows an example of a comparison of leakage current vs. ramped voltage stress computed using the same calibrated model with experimental data.

Using the model of electric current path generation and evolution, the total leakage current can be obtained by integration of leakage current density over the whole shape contour. The calculated total leakage current may be compared with experimental data derived from a particular manufacture process to adjust the parameters of the model. FIG. 11A shows an example of a comparison of leakage current evolution over time under constant voltage stress computed using a calibrated model with experimental data. FIG. 11B shows an example of a comparison of leakage current vs. ramped voltage stress computed using the same calibrated model with experimental data. The comparisons in both figures demonstrate that the calibrated model can predict the leakage current reasonably well.

Figure 12:
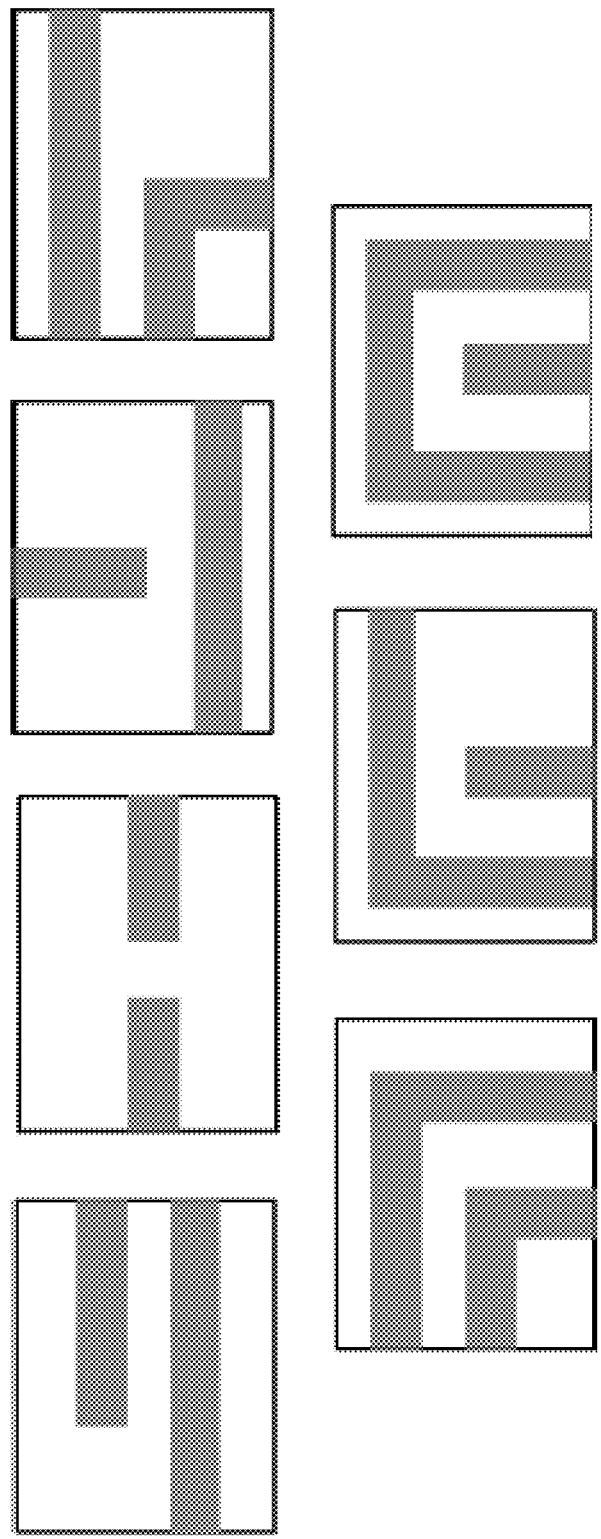
FIG. 12 illustrates an example of various patterns that may be included in the pattern database according to various embodiments of the disclosed technology.

In operation 1030, the time-to-failure computation unit 930 computes time-to-failure characteristic values for pre-calculated patterns in a pattern database. The pre-calculated patterns are layout patterns of which time-to-failure values are computed before analyzing time-dependent dielectric breakdown of a layout design. The pre-calculated patterns may be selected from frequently used and/or user-defined interconnect patterns. FIG. 12 illustrates an example of various patterns that may be included in the pattern database according to various embodiments of the disclosed technology.

Figure 13:
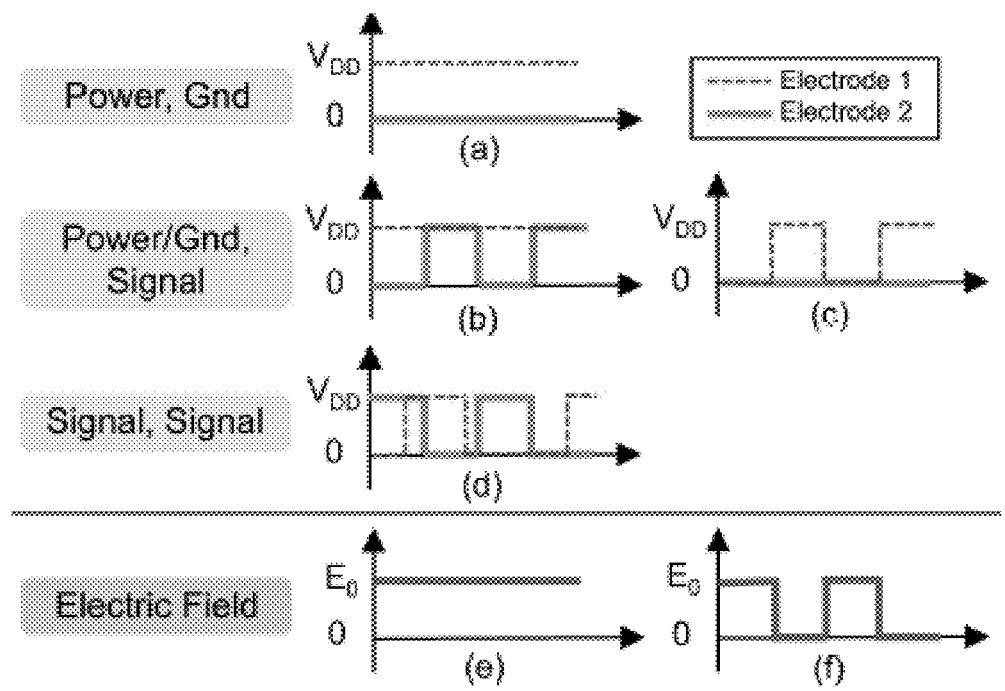
FIG. 13 illustrates three different combinations of electric loads for a pair of interconnects.

As discussed previously, the time-to-failure characteristic value varies with geometric and electrical characteristics of a given pattern. Interconnects in the integrated circuits may serve as power/ground lines or signal lines. An interconnect pattern may be characterized by different kinds of electric loads according to the following three combinations as shown in FIG. 13: for the power-ground combination, the dielectric will be stressed with a constant electric field; for the power/ground-signal combination, the dielectric will be stressed with a time-dependent field; and for the signal-signal combination, the dielectric may be stressed with a time-dependent field or a constant electric field, depending on the relative phase of the two signals.

Figure 14:
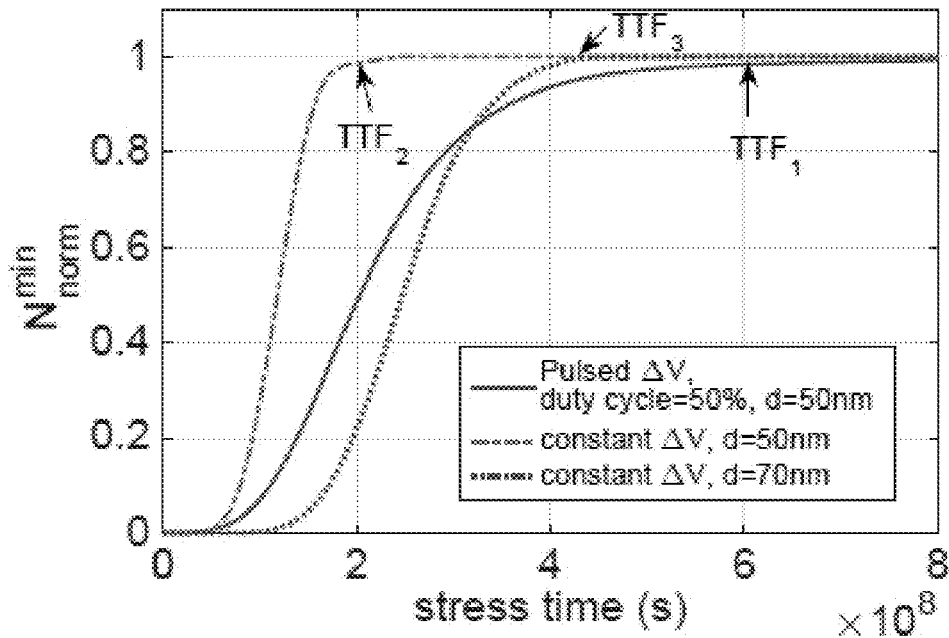
FIG. 14 illustrates an example of the kinetics of $N_{norm}^{min}$ evolution in the inter-metal dielectric gap under different electric stresses or spacing values.

Taking, for example, the structure shown in FIG. 5, and selecting line spacing as d=50 nm and d=70 nm, the timeto-failure computation unit 930 may analyze the kinetics of $N_{norm}^{min}$ evolution in the inter-metal dielectric gap, loaded with a constant voltage drop or a pulsed voltage drop with a duty cycle=50%. The result is shown in FIG. 14. As can be seen in the figure, when the patterns have the same geometries, the flux of metal ions, Eq. (5), is larger in the case of the constant electric stress, which leads to faster $N_{norm}^{min}$ evolution, and thus to a shorter time-to-failure (TTF1≈3×TTF2). Besides, when the patterns are stressed with the same voltages, a smaller line spacing results in a shorter TTF (TTF3≈2×TTF2). However, under some circumstances, a pattern with a larger spacing and constant electric stress may have a shorter TTF than the pattern with a smaller spacing but loaded with the time-dependent voltage (TTF1≈1.5×TTF3).

The time-to-failure computation unit 930 may divide the pre-calculated patterns into groups with different shapes. The time-to-failure characteristic values are computed for various wire width, length and spacing values for each group. The results may be used for populating a set of lookup tables.

In operation 1050, the pattern matching unit 950 analyzes a layout design to identify matching patterns that match a pre-calculated pattern in the pattern database. The pattern matching unit 950 may be implemented by various pattern matching tools such as those in the Calibre family of software tools available from Mentor Graphics Corporation, Wilsonville, Oreg. A matching pattern contains sets of metal segments. Each segment is a group of edges that may be described by pairs of vertices.

Exact pattern matching or fuzzy pattern matching may be conducted. In a fuzzy pattern matching process, a representative per-calculated pattern from a group of per-calculated patterns that have a similar shape may be used to identify the matching patterns. Some of the identified matching patterns may differ in line width/spacing from the representative per-calculated pattern in some region(s).

In operation 1070, the time-to-failure determination unit 970 determines time-to-failure characteristic values for the matching patterns based on the pre-computed time-to-failure characteristic values and electric attributes of geometric elements in each of the matching patterns. The electric attributes may comprise interconnect types of the geometric elements, the interconnect types comprising power lines, ground lines and signal lines. Alternatively or additionally, the electric attributes may comprise voltage information of the geometric elements. The electric attributes may be extracted using commercial EDA tools. As discussed previously, different electric attributes may lead to different time-to-failure characteristic values for the same pattern.

If the matching patterns are obtained based on fuzzy pattern matching, geometric attributes of geometric elements in each of the matching patterns such as width and/or spacing may also be based when determining the time-to-failure characteristic values.

In operation 1090, the layout design modification unit 990 identifies matching patterns most susceptible to time-dependent dielectric breakdown based on the time-to-failure characteristic values, and then modifies the layout design to fix the matching patterns most susceptible time-dependent dielectric breakdown. The modification may comprise changing shapes and/or adjusting width/spacing.

Conclusion

Having illustrated and described the principles of the disclosed technology, it will be apparent to those skilled in the art that the disclosed embodiments can be modified in arrangement and detail without departing from such principles. In view of the many possible embodiments to which the principles of the disclosed technologies can be applied, it should be recognized that the illustrated embodiments are only preferred examples of the technologies and should not be taken as limiting the scope of the disclosed technology. Rather, the scope of the disclosed technology is defined by the following claims and their equivalents. We therefore claim as our disclosed technology all that comes within the scope and spirit of these claims.

What is claimed is:

1. One or more non-transitory computer-readable media storing computer-executable instructions for causing one or more processors to perform a method, the method comprising:
    analyzing a layout design to identify matching patterns that match a pre-calculated pattern in a pattern database, each of pre-calculated patterns in the pattern database having a time-to-failure characteristic value pre-computed based on a model of electric current path generation and evolution, the model of electric current path generation and evolution assuming field-based hopping conductivity of current carriers; and
    determining time-to-failure characteristic values for the matching patterns based on the pre-computed time-to-failure characteristic values and electric attributes of geometric elements in each of the matching patterns.

2. The one or more non-transitory computer-readable media recited in claim 1, wherein the method further comprises:
    identifying matching patterns most susceptible to time-dependent dielectric breakdown based on the time-to-failure characteristic values; and
    modifying the layout design to fix the matching patterns most susceptible time-dependent dielectric breakdown.

3. The one or more non-transitory computer-readable media recited in claim 1, wherein the model of electric current path generation and evolution is calibrated with experimental data for a particular manufacture process.

4. The one or more non-transitory computer readable storage device recited in claim 1, wherein the electric attributes comprise voltage information of the geometric elements.

5. The one or more non-transitory computer readable storage device recited in claim 1, wherein the electric attributes comprise interconnect types of the geometric elements, the interconnect types comprising power lines, ground lines and signal lines.

6. The one or more non-transitory computer readable storage device recited in claim 1, wherein the determining is further based on geometric attributes of geometric elements in each of the matching patterns.

7. A method, executed by at least one processor of a computer, comprising:
    analyzing a layout design to identify matching patterns that match a pre-calculated pattern in a pattern database, each of pre-calculated patterns in the pattern database having a time-to-failure characteristic value pre-computed based on a model of electric current path generation and evolution, the model of electric current path generation and evolution assuming field-based hopping conductivity of current carriers; and
    determining time-to-failure characteristic values for the matching patterns based on the pre-computed time-to-failure characteristic values and electric attributes of geometric elements in each of the matching patterns.

8. The method recited in claim 7, further comprising:
identifying matching patterns most susceptible to time-dependent dielectric breakdown based on the time-to-failure characteristic values; and
modifying the layout design to fix the matching patterns most susceptible time-dependent dielectric breakdown.

9. The method recited in claim 7, wherein the model of electric current path generation and evolution is calibrated with experimental data for a particular manufacture process.

10. The method recited in claim 7, wherein the electric attributes comprise voltage information of the geometric elements.

11. The method recited in claim 7, wherein the electric attributes comprise interconnect types of the geometric elements, the interconnect types comprising power lines, ground lines and signal lines.

12. The method recited in claim 7, wherein the determining is further based on geometric attributes of geometric elements in each of the matching patterns.

13. A system comprising:
one or more processors, the one or more processors programmed to perform a method, the method comprising:
analyzing a layout design to identify matching patterns that match a pre-calculated pattern in a pattern database, each of pre-calculated patterns in the pattern database having a time-to-failure characteristic value pre-computed based on a model of electric current path generation and evolution, the model of electric current path generation and evolution assuming field-based hopping conductivity of current carriers; and
determining time-to-failure characteristic values for the matching patterns based on the pre-computed time-to-failure characteristic values and electric attributes of geometric elements in each of the matching patterns.

14. The system recited in claim 13, wherein the method further comprises:
identifying matching patterns most susceptible to time-dependent dielectric breakdown based on the time-to-failure characteristic values; and
modifying the layout design to fix the matching patterns most susceptible time-dependent dielectric breakdown.

15. The system recited in claim 13, wherein the model of electric current path generation and evolution is calibrated with experimental data for a particular manufacture process.

16. The system recited in claim 13, wherein the electric attributes comprise voltage information of the geometric elements.

17. The system recited in claim 13, wherein the electric attributes comprise interconnect types of the geometric elements, the interconnect types comprising power lines, ground lines and signal lines.

18. The system recited in claim 13, wherein the determining is further based on geometric attributes of geometric elements in each of the matching patterns.

* * * * *